(12) United States Patent
Romanov et al.

(10) Patent No.: US 11,502,610 B2
(45) Date of Patent: Nov. 15, 2022

(54) APPARATUS FOR DC VOLTAGE—DC VOLTAGE CONVERSION

(71) Applicant: Closed-up Joint-Stock Company DRIVE, Novosibirsk (RU)

(72) Inventors: Yuriy I. Romanov, Novosibirsk (RU); Stanislav V. Maletskiy, Novosibirsk (RU)

(73) Assignee: Drive CJSC, Novosibirsk (RU)

( * ) Notice: Subject to any disclaimer, the term of this patent is extended or adjusted under 35 U.S.C. 154(b) by 502 days.

(21) Appl. No.: 16/092,035

(22) PCT Filed: May 15, 2017

(86) PCT No.: PCT/RU2017/000309
§ 371 (c)(1),
(2) Date: Oct. 8, 2018

(87) PCT Pub. No.: WO2018/212671
PCT Pub. Date: Nov. 22, 2018

(65) Prior Publication Data
US 2021/0167697 A1   Jun. 3, 2021

(51) Int. Cl.
*H02M 3/335* (2006.01)
*H02M 1/44* (2007.01)
*H02M 1/00* (2006.01)
*H02M 7/537* (2006.01)

(52) U.S. Cl.
CPC ......... *H02M 3/33523* (2013.01); *H02M 1/44* (2013.01); *H02M 1/0006* (2021.05); *H02M 7/537* (2013.01)

(58) Field of Classification Search
CPC .............. H02M 3/335–42; H02M 1/08–096
See application file for complete search history.

(56) References Cited

U.S. PATENT DOCUMENTS

2012/0146545 A1\* 6/2012 Nerone ................ H05B 45/375
315/297

FOREIGN PATENT DOCUMENTS

EP         0030026 A1 \*  6/1981  .............. H02M 3/00

OTHER PUBLICATIONS

Machine Translation of EP 0030026. Klaus, B. (Year: 1981).\*

\* cited by examiner

*Primary Examiner* — Peter M Novak
(74) *Attorney, Agent, or Firm* — Patentagar PLLC; Alexander Rabinovich

(57) ABSTRACT

An apparatus for DC voltage—DC voltage conversion comprises connected in series a high DC voltage source, a transformer, a rectifier, and a control voltage driver. Also connected in series are a primary winding of the transformer, a controllable switch, an electronically controlled resistor (ECR), and a limiting resistor. The ECR is controlled by the control voltage driver. The controllable switch is controlled by a controllable square wave generator. The controllable square wave generator and the controlled voltage driver are fed from a low DC voltage source. The controllable square wave generator is controlled by another control voltage driver fed from the high DC voltage source. The apparatus allows for obtaining variable value of high pulse voltage across the ECR and lowers the level of electromagnetic noise radiated by the apparatus to environment.

1 Claim, 2 Drawing Sheets

APPARATUS FOR DC VOLTAGE—DC VOLTAGE CONVERSION

BACKGROUND OF THE INVENTION

Field of the Invention

Figure 1:
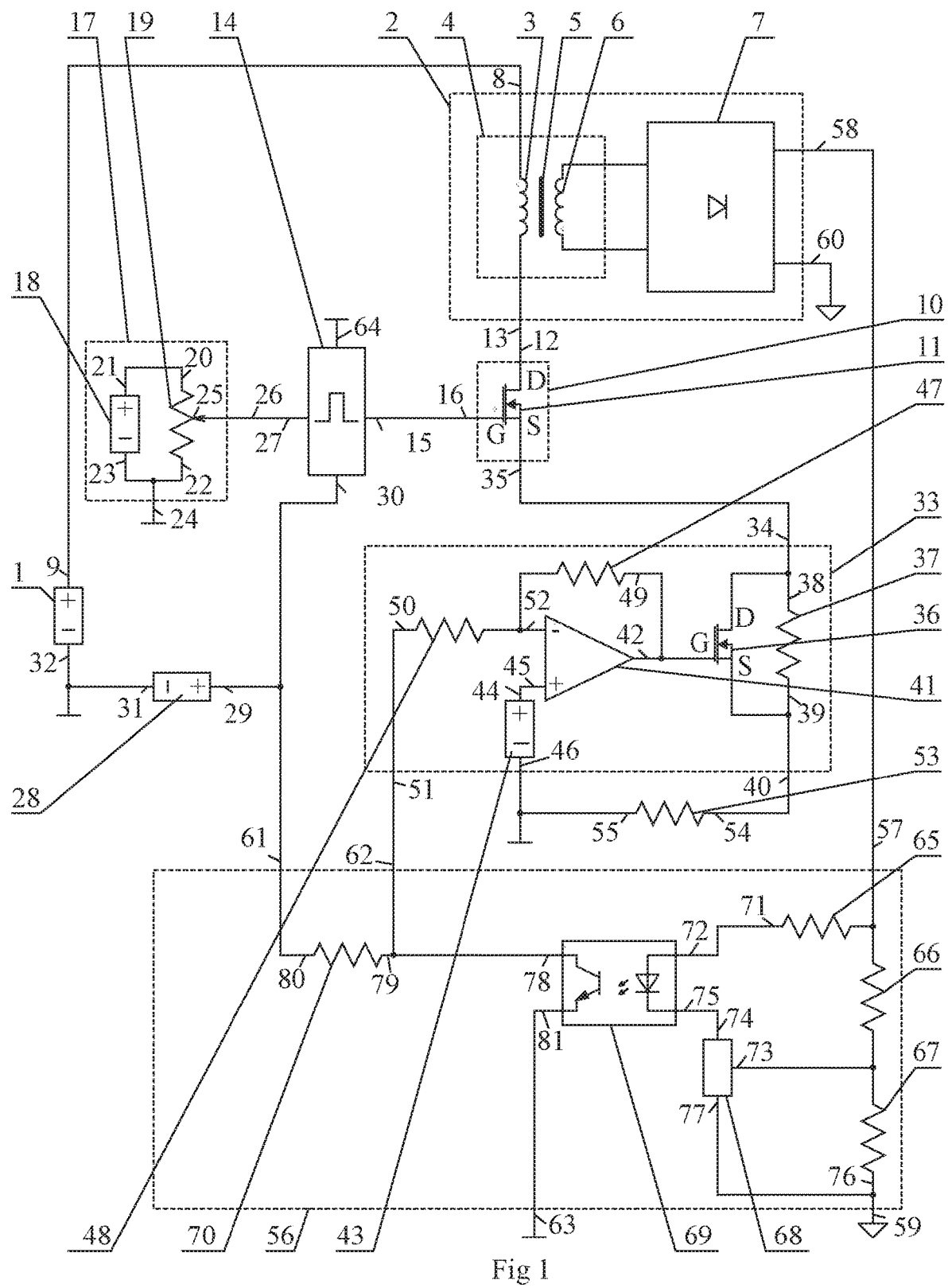

The proposed engineering solution relates to electrical engineering and can be used in variable pulse voltage power supply having reduced level of electromagnetic noise radiated to the environment, and as an additional technique among capacities for DC voltage—DC voltage conversion.

Background of the Invention

Known have been similar designs, see e.g., US 20110305048 A1 published Dec. 15, 2011, comprising the following aggregation of essential features: a high DC voltage source; a low DC voltage source, a transformer; a rectifier, a controllable square wave generator; a control voltage driver; and a controllable switch. A primary transformer winding is connected by its first terminal to a positive terminal of the high DC voltage source. A secondary transformer winding is connected by its both terminals to the rectifier. The low DC voltage source includes a third transformer winding, a rectifying diode and a filtering capacitor and is connected by its negative terminal to a negative terminal of the high DC voltage source. The controllable square wave generator is connected by its power terminals to respective terminals of the low DC voltage source. The control voltage driver is connected by its output to a control input of the controllable square wave generator. The controllable switch is connected by its first terminal to a second terminal of the first transformer winding and by its second terminal—to the negative terminals of the high DC voltage source and lower DC voltage source, and by its control input—to an output of the controllable square wave generator.

The features which are common for the proposed solution and the above analog are a high DC voltage source; a low DC voltage source connected by its negative terminal to a negative terminal of the high DC voltage source; a primary transformer winding connected by its first terminal to a positive terminal of the high DC voltage source; a rectifier; a secondary transformer winding connected by its both terminals to the rectifier; a controllable square wave generator connected by its power terminals to respective terminals of the low DC voltage source; a control voltage driver connected by its output to a control input of the controllable square wave generator; and a controllable switch connected by its first terminal to a second terminal of the primary transformer winding and by its control input—to an output of the controllable square wave generator.

Also known has been a design—see a specification of chip UCC28810 (published e.g., on www.ti.com) chosen as the closest analog (prototype)—which comprises the following aggregation of essential features: a high DC voltage source; a low DC voltage source, a transformer, a rectifier, a controllable switch, a limiting resistor, a controllable square wave generator, and a control voltage driver. The low DC voltage source includes a half of a primary winding of a transformer, a rectifying diode and a filtering capacitor and is connected by its negative terminal to a negative terminal of the high DC voltage source. The other half of the primary winding of the transformer is connected by its first terminal to a positive terminal of the high DC voltage source. A secondary transformer winding connected by its both terminals to the rectifier. The controllable switch is connected by its first terminal to a second terminal of the other half of the primary winding of the transformer. The limiting resistor is connected by one of its terminals to a second terminal of the controllable switch and by another its terminal—to the negative terminal of the high DC voltage source. The controllable square wave generator is connected by its output to a control input of the controllable switch and by its power inputs—to respective terminals of the low DC voltage source. The control voltage driver is connected by its output to a control input of the controllable square wave generator.

The features which are common for the proposed solution and the above prototype are a high DC voltage source; a low DC voltage source, a transformer, a rectifier, a controllable switch; a limiting resistor; a controllable square wave generator; and a control voltage driver. The low DC voltage source is connected by its negative terminal to a negative terminal of the high DC voltage source. The primary winding of the transformer is connected by its first terminal to a positive terminal of the high DC voltage source. The secondary transformer winding connected by its both terminals to the rectifier. The controllable switch is connected by its first terminal to a second terminal of the transformer. The controllable square wave generator is connected by its output to a control input of the controllable switch and by its power inputs—to respective terminals of the low DC voltage source. The control voltage driver is connected by its output to a control input of the controllable square wave generator.

BRIEF SUMMARY OF THE INVENTION

The technical result, which can be achieved by neither of the above technical solutions, resides in obtaining variable value of the high pulse voltage to add to the range of techniques able to perform DC voltage—DC voltage conversion, and to lower the level of electromagnetic noise radiated to the environment.

Until the present, no due attention was paid to issues aimed at obtaining variable value of the high pulse voltage. Prior art designs have only used varying (by PWM or PFM) timing parameters of the pulses of the controllable square wave generator. The magnitude of the output voltage level remains unchanged which prevents prior art designs from attaining the above technical result. Therefore, there has been a pressing need in improving known comparable technical solutions.

Analyzing the prior art leads to the conclusion that varying value of the high pulse voltage would advance the state of the art.

The above-identified technical result is accomplished by providing an apparatus combining the above common features of the prototype and further added an electronically controlled resistor and a second control voltage driver. The electronically controlled resistor is connected in series to a second terminal of the controllable switch, to the limiting resistor and to the negative terminal of the high DC voltage source, and the second control voltage driver is connected by its output to a control input of the electronically controlled resistor and by its power inputs to respective terminals of the low DC voltage source.

Analysis performed among known prior art showed that none of them comprises either the whole aggregation of the essential features of the proposed solution or its distinguishing (characterizing) features, thus permitting the conclusion about novelty of, and inventive step in, the solution.

Figure 2:
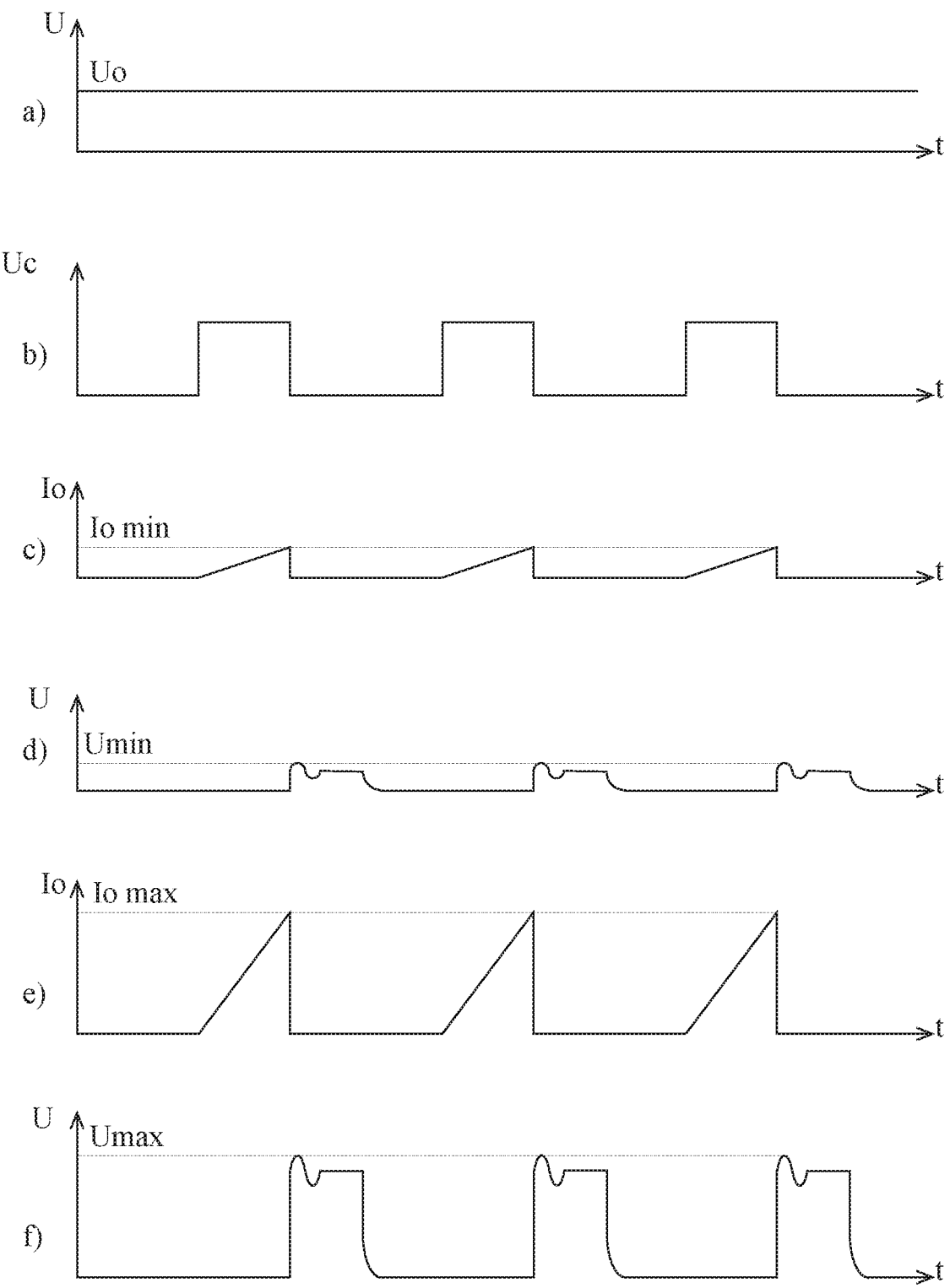

The above and other features and advantages of the proposed apparatus are described in the ensuing specification with the reference to accompanying drawings, where FIG. 1 presents a flow chart of the apparatus for DC voltage—DC voltage conversion and FIG. 2 are charts illustrating the operation of the apparatus.

DETAILED DESCRIPTION OF THE INVENTION

According to FIG. 1, the proposed apparatus for DC voltage—DC voltage conversion comprises a high DC voltage source 1, a transformer 4, a controllable switch 10, a controllable square wave generator 14, a first control voltage driver 17, a low DC voltage source 28, an electronically controlled resistor (ECR) 33, a limiting resistor 53, and a second control voltage driver 56. The transformer 4 has a primary winding 3 and a secondary winding 6 placed on a ferromagnetic core 5. The secondary winding 6 of the transformer 4 is connected to a rectifier 7. The transformer 4 and rectifier 7 in their aggregation are further referred to as an inductive load 2. The inductive load 2 is connected via one (a first) of its terminals, 8, to a positive terminal 9 of the high DC voltage source 1. The controllable switch 10 (including, e.g., a MOS transistor 11), is connected via its first (main) terminal 12 (drain of the MOS transistor 11) to another (a second) terminal 13 of the inductive load 2. The controllable square wave generator 14 is connected by its output 15 to a control input 16 of the controllable switch 10 (gate of the MOS transistor 11). The first control voltage driver 17 comprises a DC voltage source 18 and a potentiometer 19. A first terminal 20 of the potentiometer 19 is connected to a positive terminal 21 of the DC voltage source 18, a second terminal 22 of the potentiometer 19 is connected to a negative terminal 23 of the DC voltage source 18 (which terminal 23 is a first terminal 24 of the first control voltage driver 17), a third terminal (a slider) 25 of the potentiometer 19 (which terminal 25 is a second output 26 of the first control voltage driver 17) is connected to a control input 27 of the controllable square wave generator 14. The positive terminal 29 of the low DC voltage source 28 is connected to a first power (feed) input 30 of the controllable square wave generator 14, a negative terminal 31 of the source 28 is connected to a negative terminal 32 of the high DC voltage source 1. The ECR 33 is connected by its first terminal 34 to another terminal 35 of the controllable switch 10 (to source of the MOS transistor 11) The ECR 33 comprises a MOS transistor 36, an additional resistor 37 with resistance Rada, an operating amplifier (OA) 41, an offset voltage source (OVS) 43, a first resistor 47, and a second resistor 48. Drain of the MOS transistor 36 is the first terminal 34 of the ECR 33), The first terminal 38 of the additional resistor 37 is connected to drain of the MOS transistor 36, a second terminal 39 of the additional resistor 37 is connected to source of the MOS transistor 36 and to a second terminal 40 of the ECR 33. The OA 41 is connected by its output 42 to gate of the MOS transistor 36. The OVS 43 is connected by its positive terminal 44 to a non-inverting ("+") input 45 of the OA 41, and by its negative terminal 46 to the negative terminal 32 of the high DC voltage source 1. The first resistor 47, and the second resistor 48 are connected to each other and jointly define transmission efficiency of the OA 41. A first terminal 49 of the first resistor 47 is connected to the output 42 of the OA 41, a second terminal 50 of the second resistor 48 being a control input 51 of the ECR 33, and a point of connection of the first 47 and second 48 resistors is connected to an inverting ("−") input 52 of the OA 41. The limiting resistor 53 is connected via its first terminal 54 to the second terminal 40 of the ECR 33 and by a second terminal 55 to the negative terminal 32 of the high DC voltage source 1. The second control voltage driver 56 is connected by its first input 57 to a first output 58 of the rectifier 7, a first output 59 of the second control voltage driver 56 is connected to a second output 60 of the rectifier 7, a first power input 61 of the second control voltage driver 56 is connected to the positive terminal 29 of the low DC voltage source 28, a second output 62 of the second control voltage driver 56 is connected to the control input 51 of the ECR 33, and a second power input 63 of the second control voltage driver 56 is connected to the negative terminal 32 of the high DC voltage source 1, to the first terminal 24 of the first control voltage driver 17, and to a second power (feed) input 64 of the controllable square wave generator 14.

The second control voltage driver 56 comprises a current setting resistor 65, a first and a second voltage divider resistors 66 and 67, a current regulator 68, an optocoupler 69, and a feed resistor 70. A first terminal 71 of the current setting resistor 65 is connected to a first input 72 of the optocoupler 69, a point of connection of the current setting resistor 65 and the first resistor 66 of the voltage divider is a first input 57 of the second control voltage driver 56, a point of connection of the first, 66, and second, 67, resistors of the voltage divider is connected to a control input 73 of the current regulator 68. A first terminal 74 of the current regulator 68 is connected to a second input 75 of the optocoupler 69, and a second terminal 76 of the second resistor 67 of the voltage divider is connected to a second terminal 77 of the current regulator 68 and serves the first output 59 of the second control voltage driver 56. Also, a first output 78 of the optocoupler 69 is connected to a first terminal 79 of the feed resistor 70 and serves the second output 62 of the second control voltage driver 56, a second terminal 80 of the feed resistor 70 is the first power input 61 of the second control voltage driver 56, and a second output 81 of the optocoupler 69 is connected to the second power input 63 of the second control voltage driver 56.

Adding the second control voltage driver and electronically controlled resistor with the connections thereof makes it possible to regulate the amplitude of the current flowing through the inductive load.

Regulating the amplitude of the current flowing through the inductive load is performed by applying a control voltage from the output of the second control voltage driver to the control input of the electronically controlled resistor, the amplitude of the current being able to vary in a wide range. Indeed, the value of resistance of the electronically controlled resistor is set by the output voltage of the second control voltage driver. The value can vary (under the influence of the varying output voltage of the second control voltage driver) between zero (where the amplitude of the current, primarily defined by the resistance of the limiting resistor, is the highest) and the values several times (up to ten and more) higher than the resistance of the limiting resistor. In that case, the current amplitude becomes several times (up to ten and more) lower than the current amplitude at zero resistance of the electronically controlled resistor (and it is the lowest current amplitude). Accordingly, the value of the high pulse voltage developing across the inductive load decreases in proportion with the amplitude of the current flowing through the inductive load, as the resistance of the electronically controlled resistor increases, and increases in proportion with the amplitude of the current flowing through the inductive load, as the resistance of the electronically controlled resistor decreases.

Consequently, the introduction of the second control voltage driver and electronically controlled resistor with the connections thereof makes it possible—in the process of varying the amplitude of current flowing through the inductive load in the apparatus to obtain variable value of the high pulse voltage and thus to demonstrate achieving the above-mentioned technical result.

The time diagrams presented in FIG. 2 show, when viewed with FIG. 1:

2a—output voltage $U_o$ of the high voltage DC voltage source 1;

2b—pulses $U_{ctr}$ at the control input 16 of the controllable switch 10;

2c—ramp-up current flowing through the inductive load 2 at the maximal resistance of the ECR 33 and reaching the minimal value $I_{o\ min}$ by the end of the $U_{ctr}$ pulse;

2d—high pulse voltage $U_{min}$ between the terminal 13 of the inductive load 2 and the negative terminal 32 of the high DC voltage source 1 at the maximal resistance of the ECR 33;

2e—ramp-up current flowing through the inductive load 2 at the minimal resistance of the ECR 33 and reaching the maximal value $I_{o\ max}$ by the end of the $U_{ctr}$ pulse;

2f—high pulse voltage $U_{max}$ between the terminal 13 of the inductive load 2 and the negative terminal 32 of the high DC voltage source 1 at the minimal resistance of the ECR 33.

The proposed apparatus operates in the following way.

As DC voltage from the terminals 29 and 31 of the low DC voltage source 28 (FIG. 1) is applied to the power inputs 30 and 64 of the controllable square wave generator 14, the latter starts generating square pulses (FIG. 2b). The pulse ratio of the square pulses is defined by the value of the control voltage applied from the output 26 of the first control voltage driver 17 to the control input 27 of the controllable square wave generator 14.

The changing of the control voltage at the output 26 of the first control voltage driver 17 can be realized, for example, by moving the slider 25 of the potentiometer 19 connected by its terminals 20 and 22 to the positive, 21, and negative, 23, terminals of the DC voltage source 18, respectively. In this way, generating a succession of control square pulses with regulated pulse ratio takes place.

From the output 15 of the controllable square wave generator 14, the square pulses arrive at the control input 16 of the controllable switch 10 (at the gate of the MOS transistor 11), resulting in opening the controllable switch 10. Pulse current starts flowing through the controllable switch 10 in the circuit: the positive terminal 9 of the high DC voltage source 1 (FIG. 2a)—the first terminal 8 of the inductive load 2—the second terminal 13 of the inductive load 2—the controllable switch 10—the ECR 33—the limiting resistor 53—the negative terminal 32 of the high DC voltage source 1.

In this way, the succession of the control pulses periodically connects the inductive load 2 to the terminals of the high DC voltage source 1, has the pulse current through the inductive load 2 generated, and limits the same by means of the limiting resistor 53.

As this takes place, self-inductance emf brought about in the inductive load 2 prevents the current in the circuit from changing instantly. Because of this, the current ramps up linearly during the square pulse (FIGS. 2c and 2e) and reaches, by the end of the square pulse, a preset value of $I_o$ (either $I_{o\ min}$ for FIG. 2c, or $I_{o\ max}$ for FIG. 2e). At this, the value of high pulse voltage between the terminal 13 of the inductive load 2 and the negative terminal 32 of the high DC voltage source 1 is proportional to the value of $I_o$. The value of $I_o$, however, is defined by resistance of all the elements of the above circuit, i.e.

$$I_o = K_1/(R_{tr} + R_{lim} + R_{ECR}), \qquad (1)$$

where $K_1$ is a first proportionality coefficient, $R_{tr}$—resistance of the open controllable switch 10 (resistance of the open MOS transistor 11), $R_{lim}$—resistance of the limiting resistor 53, $R_{ECR}$—resistance of the ECR 33.

Due to smallness of $R_{tr}$ ($R_{tr} \ll R_{lim}$), the formula (1) can be reduced to $$I_o = K_1/(R_{lim} + R_{ECR}) \qquad (2)$$

Thus, the value of $I_o$ and, consequently, the value of the high pulse voltage between the terminal 13 of the inductive load 2 and the negative terminal 32 of the high DC voltage source 1 can be set by changing the resistance of the ECR 33.

Such a change is achieved by means of changing output voltage of the rectifier 7 between its first, 58, and second, 60, outputs (for example, due to the change of rectifier 7 load resistance). This changing voltage is applied to the first input 57 of the second control voltage driver 56 and is transferred, via the current setting resistor 65, to the first input 72 of the optocoupler 69. Therefore, changing current flows via the optocoupler 69, the value of the current depending on the voltage at the first input 72 of the optocoupler 69 and on the parameters of the first, 66, and second, 67, resistors of the voltage divider, and current regulator 68. Accordingly, changing voltage appears at the output 78 of the optocoupler 69 and at the first terminal 79 of the feed resistor 70, whose second terminal 80 is connected to the positive terminal 29 of the low DC voltage source 28 via the first power input 61 of the second control voltage driver 56. This changing voltage is applied to the second output 62 of the second control voltage driver 56.

As voltage at the second output 62 of the second control voltage driver 56 changes, control voltage (arriving from the second output 62 of the second control voltage driver 56 to the control input 51 of the ECR 33) is applied via the second resistor 48 to the inverting ("−") input 52 of the OA 41 acting as a DC voltage amplifier. The operation mode of the OA 41 is set by the voltage at the positive output 44 of the OVS 43 which is applied to the non-inverting ("+") input 45 of the OA 41. Thus, a control signal (whose value is defined by correlation of resistance of the first, 47, and second, 48, resistors setting the transmission ratio of the OA 41) is generated at the output 42 of the OA 41 and is directed to the gate of the MOS transistor 36. When the control signal is zero, the MOS transistor 39 is closed and has no effect on resistance $R_{add}$ of the additional resistor 37. Therefore, the resistance of the ECR 33 is maximal and amounts to $$R_{ECR} = R_{add}, \qquad (3)$$

and $I_o$ is minimal and equals to $$I_{o\ min} = K_1/(R_{lim} + R_{add}) \qquad (4)$$

Corresponding to the minimal current $I_{o\ min}$ flowing through the inductive load 2 at $R_{ECR} = R_{add}$ (FIG. 2c) are the minimal value of high pulse voltage between the terminal 13 of the inductive load 2 and the negative terminal 32 of the high DC voltage source 1 (FIG. 2d) and the minimal level of pulse electromagnetic noise radiated to the environment.

As the output voltage of the second control voltage driver 56 changes (which can be the case, for example, upon lowering the output voltage of the rectifier 7), the control signal arriving to the gate of the MOS transistor 36 increases and opens the MOS transistor 36. Current starts flowing through the MOS transistor 36, and the through resistance of the MOS transistor starts decreasing and shunting $R_{add}$ of the additional resistor 37. Thus, the resultant resistance of the ECR 33 starts decreasing. In extreme case, where the control signal arriving to the gate of the MOS transistor 36 is so large that the MOS transistor 36 is completely open, it fully shunts the additional resistor 37, the resistance of the ECR 33 nears zero, and $I_o$ becomes maximal and equal to $$I_{o\ max} = K_1/R_{lim} \qquad (5)$$

Corresponding to the maximal current $I_{o\ max}$ flowing through the inductive load 2 at $R_{ECR}=0$ (FIG. 2e) are the maximal value of high pulse voltage between the terminal 13 of the inductive load 2 and the negative terminal 32 of the high DC voltage source 1 (FIG. 2f) and the maximal level of pulse electromagnetic noise radiated to the environment.

Thus, by changing the resistance of the ECR 33 upon changing the output voltage of the second control voltage driver 56, it becomes possible in the proposed apparatus to vary the current flowing in the above-discussed circuit within limits from $I_{o\ min}$ to $I_{o\ max}$. In this manner, the value of the high pulse voltage between the terminal 13 of the inductive load 2 and the negative terminal 32 of the high DC voltage source 1 can be set.

Prior art designs, the prototype including, change the pulse ratio (for example, by means of the first control voltage driver 17 and controllable square wave generator 14). However, as the pulse ratio changes, $I_o$ remains unchanged and equal to $I_{o\ max}$. Consequently, the value of high pulse voltage between the terminal 13 of the inductive load 2 and the negative terminal 32 of the high DC voltage source 1 remains unchanged.

Occurring during the existence of the pulse is radiation to the environment of a portion of pulse power $$P_{rad} = K_2 I_{o\ max}^2 \qquad (6)$$

where $K_2$ is the second coefficient of proportionality.

Radiating a portion of the pulse power to the environment gives rise to pulse electromagnetic noise interfering with the operation of closely adjacent radio electronics and negatively affecting their efficiency. Additionally, electromagnetic radiation to the environment results in worsening ecology in the human environment.

It is suggested in the proposed technical solution to change L within the limits between $I_{o\ min}$ and $I_{o\ max}$ by controlling resistance of the ECR 33. Therefore, the electromagnetic noise of maximum value $P_{rad} = K_2 I_{o\ max}^2$ occurs only at the nominal value of the high pulse voltage between the terminal 13 of the inductive load 2 and the negative terminal 32 of the high DC voltage source 1. As L decreases, the power of pulse electromagnetic noise falls as the square of the $I_o$. Due to that, the influence of the noise on the efficiency of the closely adjacent radio electronics and the ecology in the human environment lowers.

Hence, the apparatus implementing the proposed engineering design performs same functions when compared with prior art apparatuses. It differs from the prior art by making it possible to change not only the pulse ratio of the control square pulses, but also the value of the high pulse voltage between the terminal 13 of the inductive load 2 and the negative terminal 32 of the high DC voltage source 1, whereby the declared technical result is attained.

The functional units making the proposed apparatus can be realized in a number of ways.

For example, the controlled square wave generator 14 can include a microchip functioning as a pulse-width modulator (e.g., UCC2813QDR-5Q1 of Texas Instruments (TI)), or as a microchip fulfilling the function of a pulse-frequency modulator (e.g. FAN-6300H of ON Semiconductor), or as any other circuitry providing the pulse ratio change in a succession of square pulses.

The first control voltage driver 17 can be realized as shown in FIG. 1 or using any other way of converting a control action to a control voltage, including those with a feedback loop.

The second control voltage driver 56 can be realized either as shown in FIG. 1 or employing conventional sources of reference voltage and operational amplifiers, or by using any other way of converting a control action to voltage controlling the ECR, including those with a feedback loop.

Microchip TL431 of TI or its analogs can be used as the current regulator 68 shown in FIG. 1.

The transistor of the controllable switch 10 can be of a bipolar, or of a MOS, or of an IGBT-type. The switch itself can comprise additional circuitry improving its performance.

Low voltage sources 18, 28, and 43—in the apparatus taken as a whole, and in its first control voltage driver 17 and the ECR 33 can be transformed into one low voltage source provided with relevant resistive dividers.

The ECR 33 can be used as shown in FIG. 1, or employ circuitry disclosed in ABC of transistor circuitry by A. Petrov, R L, 1994 (http://zpostbox.ru/az0.htm, Ch. 11, Synchronous rectifiers), or use any other circuitry making it possible to change the resistance of a portion of a circuit from nearly zero to the value comparable with the resistance $R_{lim}$.

All the other components of the apparatus are well known and disclosed in various sources dealing with pulse technique and radio electronics.

In any of the implementations, changing current flowing through the inductive load and, thus changing output pulse voltage is made possible, to thereby decrease the level of pulse electromagnetic noise radiated to the environment and, in this way, achieve the technical result of the present apparatus for DC voltage to DC voltage conversion.

What is claimed is:

1. An apparatus for DC voltage to DC voltage conversion, the apparatus comprising
   a high DC voltage source,
   a rectifier,
   a transformer directly connected by one terminal of its primary winding to a positive terminal of the high DC voltage source and by both terminals of its secondary winding to the rectifier,
   a low DC voltage source,
   a controllable switch connected by a terminal thereof to another terminal of the primary winding of the transformer,
   a limiting resistor,
   a controllable square wave generator having an output connected to a control input of the controllable switch and having power inputs directly connected to terminals of the low DC voltage source, and
   a first control voltage driver having an output directly connected to an input of the controllable square wave generator,
   wherein further provided are
   an electronically controlled resistor and
   a second control voltage driver, the electronically controlled resistor, limiting resistor and the negative terminal of the high DC voltage source being connected in series with a second terminal of the controllable switch, the second control voltage driver having an input connected to a first output of the rectifier, having an output directly connected to a control input of the electronically controlled resistor, and having power inputs directly connected to respective terminals of the low DC voltage source.

* * * * *